United States Patent [19]

Wesley et al.

[11] Patent Number: 4,789,507

[45] Date of Patent: Dec. 6, 1988

[54] PRODUCTION OF PRECERAMIC AND CERAMIC FIBERS FROM FRIABLE, THERMALLY SENSITIVE ORGANOSILICON PRECERAMIC POLYMERS

[75] Inventors: John L. Wesley, Wayne; Henry H. George, Jr., Westfield, both of N.J.

[73] Assignee: Hoechst Celanese Corporation, Somerville, N.J.

[21] Appl. No.: 791,877

[22] Filed: Oct. 28, 1985

[51] Int. Cl.[4] .................. D01F 6/96; D01F 9/10; B29C 47/10; B29C 47/92

[52] U.S. Cl. ................... 264/29.2; 264/40.1; 264/40.4; 264/40.7; 264/56; 264/176.1; 264/211.15; 264/211.22; 264/211.23; 264/349

[58] Field of Search .......... 264/40.1, 40.7, 29.2, 264/211.21, 211.22, 211.23, 56, 40.4, 211.15, 176.1, 349

[56] References Cited

U.S. PATENT DOCUMENTS

| | | | |
|---|---|---|---|
| Re. 31,447 | 11/1983 | Baney et al. | 264/65 |
| 3,225,963 | 12/1965 | Arpajian | 222/1 |
| 3,915,344 | 10/1975 | Hargreaves et al. | 222/134 |
| 3,982,509 | 9/1976 | Colling et al. | 123/97 R |
| 3,984,509 | 10/1976 | Hall et al. | 264/40.1 |
| 4,138,463 | 2/1979 | Moneghan | 264/40.4 |
| 4,310,651 | 11/1982 | Baney et al. | 528/21 |
| 4,312,970 | 1/1982 | Gaul, Jr. | 526/279 |
| 4,340,619 | 7/1982 | Gaul, Jr. | 427/228 |
| 4,342,712 | 8/1982 | Yajima et al. | 264/63 |
| 4,431,598 | 2/1984 | Korpman | 264/40.7 |
| 4,482,669 | 11/1984 | Seyferth et al. | 524/442 |
| 4,482,689 | 11/1984 | Haluska | 528/25 |
| 4,591,467 | 5/1986 | Kopernicky | 264/37 |

OTHER PUBLICATIONS

Ceramic Bulletin, vol. 62, No. 8, 1983, pp. 893–898, Yajima; "Special Heat-Resisting Materials from Organometallic Polymers".

Plastics Engineering, Jun. 1978, pp. 45–49, McKelvey & Steingiser; "Improved Processing with Metered-Starved Feeding of Extruders".

*Primary Examiner*—Jan H. Silbaugh
*Assistant Examiner*—Hubert C. Lorin
*Attorney, Agent, or Firm*—Depaoli & O'Brien

[57] ABSTRACT

Improved melt spinning of friable, thermally sensitive organosilicon preceramic polymers is obtained by using externally-metered feed means for continuous feeding of the polymer to an extruder. Starve feeding by metering the feed at a rate less than that required to fill the feed screw flights prevents pulverizing and compaction of the friable polymer, leading to cross-linking of trapped polymer and solid plugging, which would cause the extruder to bind and cease to function. Metered feed can be obtained by either monitoring of screw loading or discharge pressure and adjustment of hopper feed rate or control based upon measured values of extruder speed or metering pump speed.

19 Claims, 1 Drawing Sheet

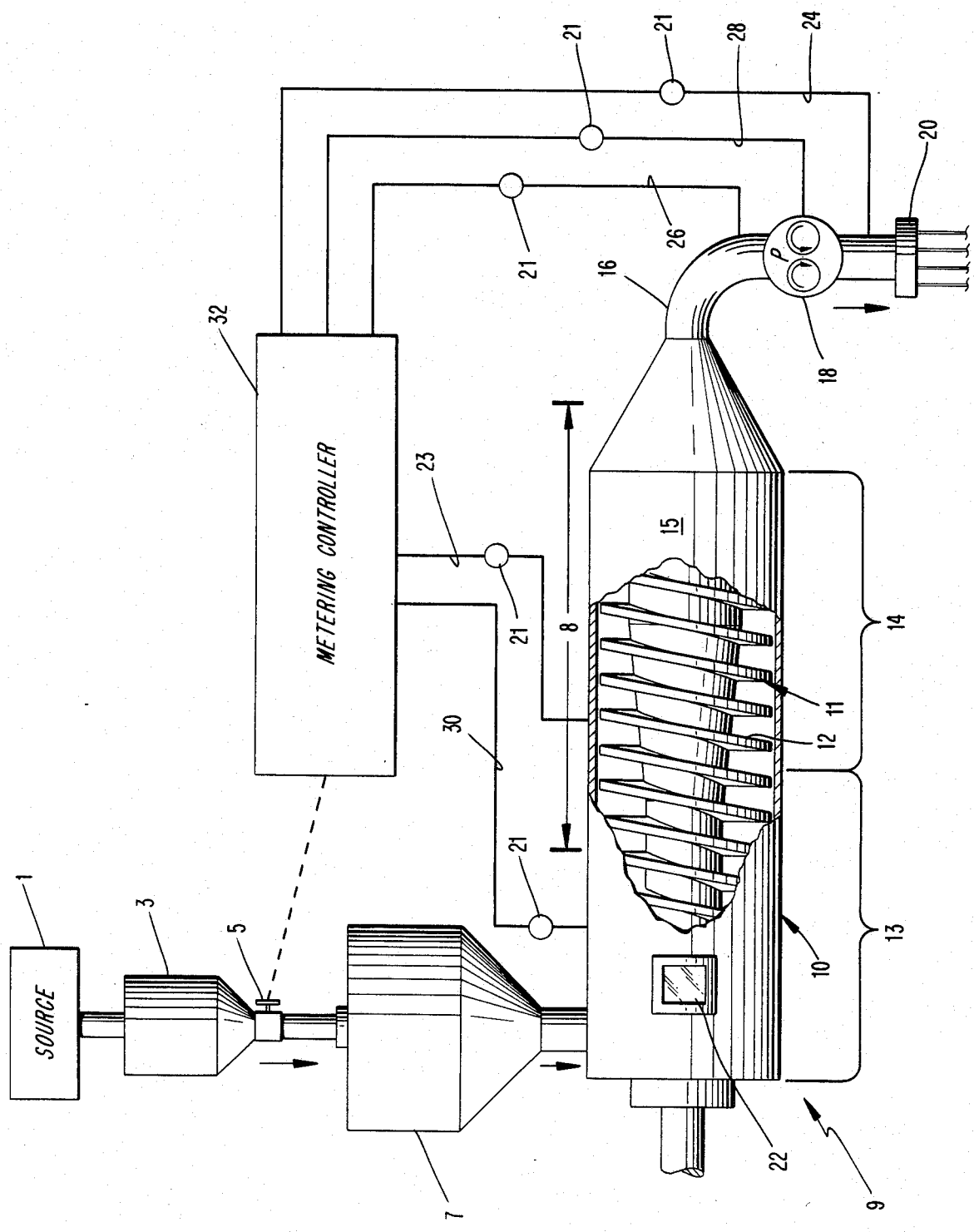

PRODUCTION OF PRECERAMIC AND CERAMIC FIBERS FROM FRIABLE, THERMALLY SENSITIVE ORGANOSILICON PRECERAMIC POLYMERS

RIGHTS OF THE GOVERNMENT

This invention was made with Government support under a Subcontract with Dow Corning under Prime Contract No. F33615-83-C-5006 awarded by the Department of Defense (DOD). The Government has certain rights in this invention.

FIELD OF THE INVENTION

This invention relates to the production of preceramic and ceramic fibers from organosilicon polymers.

BACKGROUND OF THE INVENTION

Ceramic materials are of critical importance for a number of high temperature, high performance applications such as gas turbines. These applications require a unique combination of properties such as high specific strength, high temperature mechanical property retention, low thermal and electrical conductivity, hardness and wear resistance, and chemical inertness. Design reliability and the need for economical fabrication of complex shapes, however, have prevented ceramic materials from fulfilling their potential in these critical high temperature, high performance applications.

The design reliability problems with ceramics, and the resultant failure under stress, are due largely to the relatively brittle nature of ceramics. This, in combination with the high cost of fabricating complex shapes, has limited the usage of ceramics.

Ceramics made from organosilicon polymers have the potential to overcome these problems. To this end, polymers based on silicon, carbon and/or nitrogen have been developed. See, for example, "Siloxanes, Silanes and Silazanes in the Preparation of Ceramics and Glasses" by Wills et al, and "Special Heat-Resisting Materials from Organometallic Polymers" by Yajima, in Ceramic Bulletin, Vol. 62, No. 8, pp. 893–915 (1983), and the references cited therein.

The major and most critical application for ceramics based on polymer processing is high strength, high modulus, reinforcing fibers. Such fibers are spun from organosilicon preceramic polymers, and then cured and pyrolyzed to their ceramic form. The low molecular weight and highly branched structure of typical preceramic polymers, however, alters the spinning and subsequent fiber handling behavior of these polymers from that of conventional polymers. For example, gelation and foaming tendencies in the melted polymers used for melt spinning may lead to the presence of undesirable flaws in the resulting fiber. Such flaws are undesirable in fine diameter fibers since they are believed to be the source of cracking and lowered tensile strength. Furthermore, because of the low molecular weight of the preceramic polymers used, the fibers spun therefrom have relatively low tensile strength and are difficult to handle in spinning, curing and subsequent pyrolysis operations. In addition to the thermal sensitivity of these organosilicon preceramic polymers, another problem in their melt spinning or extrusion is friability, i.e., the polymer chips are brittle and fragile, easily becoming crumbly, powdery or pulverulent upon physical handling, in contrast to chips of conventional polymers which will yield or deform. When subjected to compressive forces encountered in an overloaded transport screw such as those used in screw-type extruders, organosilicon preceramic polymer chips tend to produce powdery fines which deposit easily in crevices, thus compacting and becoming trapped in areas such as the screw flights. This problem is aggravated by the tendency of such fine particles of organosilicon preceramic polymers to physically adhere to metal surfaces as they soften. In typical screw-type extruders, this allows the trapped polymer particles to become prematurely heated, with the result that the polymer crosslinks, forming solid plugs that clog the extruder Also, regardless of whether the clogged extruder ceases to function, the increased melt residence time for the polymer in the extruder leads to thermal degradation and the production of preceramic and ceramic fibers of lowered tensile strength, thus increasing fiber handling difficulties.

Thus, the search has continued for improvements in these non-conventional melt spinning and fiber handling areas of ceramic fiber technology. The present invention was made as a result of this search.

SUMMARY OF THE INVENTION

Accordingly, a primary object of the present invention is to provide improvements in the production of preceramic and ceramic fibers from organosilicon preceramic polymers.

Another object of the present invention is to provide improved melt spinning processes and apparatus for the production of fine diameter, continuous organosilicon preceramic fibers of improved tensile strength, and ceramic fibers made therefrom having improved handleability, e.g., increased toughness.

Another object of the present invention is to provide improved processes and apparatus for the production of preceramic and ceramic fibers from thermally sensitive, friable, organosilicon preceramic polymers.

Still another object of the present invention is to provide improved processes and apparatus systems for the melt spinning of organosilicon preceramic fibers, wherein compaction, cross-linking and solidification of the polymer in the feed and extrusion apparatus are avoided, and melt residence times are minimized.

In accordance with one aspect of the present invention, a process is provided for producing preceramic fibers from an organosilicon preceramic polymer by melt spinning a polymer spinning composition comprising the organosilicon preceramic polymer in spinning apparatus comprising extruder feed means and a screw-type extruder, the process comprising the steps of:

(a) monitoring at least one parameter representative of the loading of the extruder screw with the polymer spinnng composition, (b) generating a signal representative of the loading of the extruder screw, and, (c) in response to such a signal, adjusting the feed rate of polymer to the extruder through the feed means to provide a flow rate of the polymer within the extruder which is less than the flow rate required to fill all screw flights of the extruder, thereby providing starved feeding to the extruder.

Further in accordance with the present invention, a process is provided for producing preceramic fibers from an organosilicon preceramic polymer, which process comprises melt spinning a spinning composition comprising at least one organosilicon preceramic polymer in apparatus comprising a screw-type extruder, metering pump means and feed means comprising a drip feeder, wherein the feed means are externally metered in response to measured values of at least one of the speed of the extruder screw and the metering pump means, thereby starve feeding the extruder by providing a feed rate substantially less than that required to fill all screw flights of the extruder, such that pulverization, compaction and crosslinking of the polymer in the extruder are substantially avoided.

Further in accordance with the invention, a process is provided for producing ceramic fibers from melt spun preceramic fibers prepared by the process described above, comprising the additional steps of curing the spun fiber at a temperature effective to render it infusible and thereafter pyrolyzing the cured fiber at a temperature effective to product a ceramic fiber.

In accordance with another aspect of the present invention, apparatus is provided for melt spinning preceramic fibers from an organosilicon preceramic polymer, which apparatus comprises extruder feed means and a screw-type extruder, wherein the extruder feed means comprise means for external metering to provide a feed rate of the polymer feed composition which is less than that required to fill all screw flights of the screw-type extruder with a spinning composition for a given extruder speed.

In another apparatus aspect, means are provided for independently metering the feed rate of the polymer feed to the extruder feed means after monitoring of at least one of the amount of the spinning composition in the screw flights of the extruder, and the discharge pressure of the spinning composition from the extruder.

In another apparatus aspect, means are provided for externally metering the feed rate of the polymer feed to the extruder feed means in response to a signal based upon measured values of at least one of the speed of the extruder screw and the pumping speed of the metering pump means provided.

These and other objects, aspects and advantages, as well as the scope, nature and utility of the present invention, will be apparent from the following detailed description, the drawing and the appended claims.

BRIEF DESCRIPTION OF THE DRAWING

The sole figure is a block diagram illustrating a feedback control loop in accordance with the process of the present invention.

DESCRIPTION OF THE PREFERRED EMBODIMENTS

The Organosilicon Preceramic Polymers

Organosilicon preceramic polymers are well known in the art. Such polymers contain silicon, carbon and/or nitrogen, are fiber-forming, and can be cured and pyrolyzed to ceramic form. See, for example, U.S. Pat. Nos. 4,310,651; 4,312,970; 4,342,712; 4,482,689 and 4,340,619, which are incorporated herein by reference. Such polymers optionally may be modified with chemical groups to allow subsequent curing in the absence of oxygen. See, for example, U.S. Pat. No. Re. 31,447, which is incorporated herein by reference.

These organosilicon precursor polymers may be made in a variety of ways as is known in the art. For example, they may be made by first dechlorinating an alkychlorosilane, e.g., dimethyldichlorosilane, and polymerizing the product to form a polysilane, e.g., polydimethylsilane. This material is then heated to convert its backbone of silicon atoms to a backbone of alternating silicon and carbon atoms by forming a polycarbosilane.

Preferably, the organosilicon preceramic polymers utilized in the present invention consist essentially of silicon, carbon, and nitrogen. Such polymers are typically prepared by reacting a disilazane and dichlorodisilane or a methylchlorodisilane.

Most preferably, the organosilicon preceramic polymers of the present invention are characterized as polysilazanes prepared from methylchlorodisilanes and hexamethyldisilazane. Particularly preferred are polysilylazanes, having N-Si-Si-N linkages. Optionally, the addition of difunctional monosilanes as coreactants may be used to enhance spinning and/or subsequent fiber handling properties. Such difunctional monosilanes include preferably $R_1R_2SiCl_2$, where $R_1$ and $R_2$ may independently be a methyl, phenyl or vinyl group.

Such organosilicon preceramic polymers may be further modified, for example, by incorporating vinyl functionality by reacting with the polymer itself. This may be achieved, for example, by co-reacting the polymer with a vinyl (Vi) halosilane such as $ViR_1R_2SiCl$, where $R_1$ and $R_2$ may each independently be methyl or phenyl.

Another preferred type of organosilicon polymer which is thermally sensitive and which may be especially suitable in the present invention comprises a plurality of cyclic and/or linear precursor residues of the repeating units of formula I:

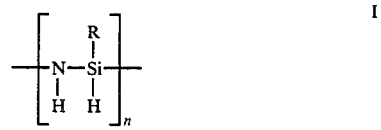

linked together by $Si_2N_2$ bridges of formula II,

wherein R is hydrogen, a lower alkyl group having from 1 to about 6 carbon atoms, a substituted or unsubstituted vinyl group, a substituted or unsubstituted allyl group, a substituted or unsubstituted benzyl group, a substituted or unsubstituted lower aryl group having from 6 to about 10 carbon atoms, a tri(lower)alkylor di(lower)alkylsilyl group, a di(lower)alkylamino group, or a lower alkoxy group having from 1 to about 6 carbon atoms; and n is an integer greater than one. The substituted groups are substituted with lower alkyl (having, e.g., from 1 to about 4 carbon atoms) and lower aryl (having, e.g., from 6 to about 10 carbon atoms) groups.

These polymers form novel ladder-like or planar array structures that are soluble in common organic solvents, stable at room temperature and thermally stable up to about 550° C. The ladder-like or planar array polymers of the present invention are formed in high yield by reaction of the cyclic and/or linear residues in the presence of a basic catalyst capable of deprotonating an NH function adjacent to silicon.

These substituted silazane polymers and their preparation are described more fully in U.S. Pat. No. 4,482,669 to Seyferth et al, assigned on its face to Massachusetts Institute of Technology, which patent is herein incorporated by reference Molecular weight ($M_n$) for the above organosilicon preceramic polymers may vary from about 500 to 20,000, preferably about 700 to 5,000, and most preferably 1,000 to 2,000 (g/moleGPC method). These polymers may also have softening temperatures ($T_s$) of about 50° C. to 300° C., preferably about 60° C. to 200° C., and most preferably 70° C. to 150° C.

The organosilicon preceramic polymer compositions to which the present invention is applicable can contain various ingredients in addition to the organosilicon polymers as the major portion, such as additional synthetic fiber-forming polymers, preferably thermoplastic, and various additives. Since the properties of the predominant organosilicon polymers in the feed are determinative, the invention will be discussed in terms of the organosilicon polymers alone. In preferred embodiments, the spinning composition consists essentially of at least one organosilicon preceramic polymer.

In particular, these organosilicon polymers are so friable and temperature sensitive that when they are fed to an extruder by a screwfeed machine, gravity or force feeding, excessive pressure created by such feed means, or improper screw pitch, or insufficient clearance between screw and casing, can cause pulverization of the chip, and the resulting compaction of polymer fines in the screw flights. Such compaction of polymer particles in the screw flights can cause cross-linking of the polymer due to thermal exposure, with the result being the clogging of the screwfeed and extruder. The friability of the organosilicon polymers remains a problem even when they are spun into fiber form, with such fibers requiring minimal contact and handling in takeup and winding to produce spun yarn packages.

Starve Feeding of the Extruder

Polymer melt spinning compositions are typically fed to an extruder in the form of polymer particles, or chip, and in this form can contain particles of at least one type of polymer, as well as various additives which are added to the polymer to produce a spinning composition. Since organosilicon preceramic polymers are friable and thermally sensitive, the spinning composition is generally fed to a screw-type extruder as non-powdery particles or polymer chip of relatively uniform size, and is converted to a melt just before the actual extrusion step. Varied mixing and grinding apparatus can be used in the feed system to produce a homogeneous spinning composition containing organosilicon polymer particles of substantially uniform size.

As discussed above, due to the characteristics of the organosilicon polymers, if the transport section or feed zone of a screw-type extruder is overfilled or overloaded with the polymer chip or spinning composition, due to various factors including compaction and increased residence time in the screw flights, the polymer will ten to pulverize and compact in the screw flights, then cross link, forming a solid mass which obstructs the screw flights and the entire extruder.

To avoid such malfunctions, it has been discovered that it is possible to starve feed such extruders in response to various observed or sensed parameters associated with the operation of the extruder. By starve feeding, it is meant that less polymer chip or composition is provided to the extruder feed zone through extruder feed means than the maximum flow rate through the extruder at any given extruder screw speed, preferably substantially less than such maximum rate, i.e., less than about 75 percent, and preferably in the range of from about 25 to about 50 percent, of such flow rate. The minimum flow rate required is that which will maintain a constant extruder discharge pressure and maintain a threadline.

The present invention is applicable to processes for melt spinning or extruding organosilicon preceramic polymers with any suitable type of screw-type extruder, including single screw models, twin screw models with screws which are co-rotating, counter-rotating and/or intermeshing, so-called "wiper screw" extruders of the type described in U.S. Pat. No. 3,982,509, herein incorporated by reference, and the like. Adjustable rate feed means are provided, using gravity, mechanical or pneumatic means to introduce the polymer chip into the extruder. Any suitable adjustable rate feed means can be used to practice the present invention, but in a presently preferred embodiment, adjustable level feed hoppers are used, such as those disclosed in U.S. Pat. Nos. 3,915,344 and 4,138,463, which are hereby incorporated by reference. In another preferred embodiment, the feed means comprise a "drip feeder" which is capable of metering the feed of polymer chip without subjecting it to gravitational overpressure. Such feeders typically include a ramp or chute having a gradual slope, down which the polymer chip will flow or slide when agitated by rotational and/or vibrational mechanical means. Means are included for varying the degree of agitation, and thus the flow rate. Such feeders are available from C. W. Brabender Instruments, Inc., South Hackensack, N.J.; the Vibra Screw Company of Totowa, N.J.; and the K-Tron Company of Glassboro, N.J.

The screw(s) used in the extruder should preferably be relatively short, providing mainly conveying effect rather than compression, producing a relatively short residence time and minimum extrusion work for the polymer composition. The feed zone, or transport flights, should amount to about 30 to about 70 percent of the total extruder length, with the compression zone or flights amounting to from about 10 to about 30 percent of the extruder length. A short transition zone can optionally be included between the transport and compression zones. The compression ratio in the compression zone can be in the range of from about 2:1 to about 4:1, preferably in the range of from about 2:1 to about 2.5:1. For example, a suitable single extruder screw could have a relatively long feed zone, say 15 out of 24 flights, having a relatively short compression zone, say 5 out of 24 flights, with a relatively low compression ratio e.g., 2:1, compared to the 3:1 commonly used in extruders for conventional polymers.

To protect the polymer chip from premature heating, the feed hoppers or other feed apparatus are preferably cooled by water or other coolants to a temperature generally below the glass transition temperature (Tg) of the polymer. On the other hand, melt handling portions of the extruder, including the nozzles, are heated to appropriate temperatures, e.g. above the Tg, to facilitate the extrusion and spinning process. Although the organosilicon preceramic polymers can be handled and spun in air, for the production of fibers of high quality and the most effective prevention of cross-linking of the polymer chip in the extruder, the entire handling and spinning process is preferably carried out under an atmosphere of an inert, or oxygen free, gas such as nitrogen or argon. Such an atmosphere can be provided in a threadline enclosure, which can be heated or cooled to retard or accelerate the setting of the spun polymer as appropriate.

Referring now to the drawing, at least one source such as (1) is provided for polymer chip, including at least one organosilicon preceramic polymer. The polymer chip is preferably provided in a relatively uniform particle size, e.g., having an average maximum dimension between about ⅛" and ¾" and substantially free of fines. Generally, the largest sized chips which the feed system will accommodate are preferred, since the resulting reduced particle size tends to reduce reactions of the polymer with the atmosphere. The polymer chip is ground to finely-divided, substantially powder-fee particles of substantially uniform size, e.g. 80 percent of the particles being approximately 0.030" in maximum dimension, in a dispensing or supply hopper (3) which has a flow feeder (5) to control the flow into the optional extruder feed hopper (7) which provides feed means for the extruder, and further mixing means if appropriate. Other dispensers, not shown, can be provided to introduce such other additives as may be necessary to produce a polymer spinning composition with the desired properties. The organosilicon preceramic spinning composition can consist essentially of the organosilicon preceramic polymer, or optionally can contain at least one other synthetic fiber-forming polymer such as a thermoplastic polymer.

Any suitable flow controller can be used in conjunction with such hoppers to provide "on-off" or variable flow control as required, utilizing valves actuated directly or remotely through metered control devices, or other feeding devices as disclosed in U.S. Pat. No. 3,984,509, which is incorporated herein by reference. To avoid bridging in the hopper or excessive static pressure from the accumulated polymer feed composition, the height of the polymer in the hopper is preferably controlled by suitable means, such as described in U.S. Pat. No. 3,225,963, which is incorporated herein by reference. In a preferred embodiment, the feed means include a "drip" feeder such as described above, which is capable of providing metered flow of the polymer feed without excessive gravitational pressure on the feed in a hopper or the feed section of the extruder.

An extruder (9) is shown schematically as including at least a barrel (10) and at least one screw (11) with multiple screw flights (12), providing a feed zone (13) and a compression zone (14). The screw is driven by an external power source (not shown). At least a portion of the feed zone is water-cooled to prevent premature softening of the polymer. The polymer chip passes from the source through hopper (3) to the optional extruder feed hopper (7), undergoing mixing and grinding as necessary, which introduces the polymer particles into the extruder feed zone at the desired rate. The polymer chip then is transported and further mixed through the extruder barrel by the screw before encountering a heating zone (8) in the compression zone which produces a homogeneous melt. As shown, the diameter of the extruder screw shaft upon which the flights are mounted (i.e. root diameter) gradually increases between the beginning and end of the compression zone (14). The annular volume available in each flight for conveying and compressing the polymer thus decreases along this same distance. The compression ratio between beginning and end of the compression zone, or between any two flights, is determined by the ratio of these annular volumes. Although the pitch, helix angle and channel widths are constant in the transport and compression sections of the extruder screw shown, these features can also be varied along the length of the screw to produce the desired transport, mixing and compression performance. The polymer melt is fed from the extruder through a melt zone (15) barrel to a nozzle (16) which introduces the polymer to a metering pump (18), such as a constant displacement, gear-type pump, from which it emerges as a stream of constant pressure and flow rate to be extruded through spinnerets (20), then taken up as fiber by other machinery (not shown). Preferably, the nozzle and spinnerets are oriented in a way such as shown, so that the fibers are extruded in a downward direction, thus reducing the stress on the freshly-spun fibers.

Various parameters or performance characteristics of the operating extruder can be observed or monitored, then used to generate a signal which can be used to control the flow rate of polymer chip into the extruder, thus reducing or eliminating the pulverization and compaction of polymer in the transport flights of the extruder screw and the resultant probable clogging of the extruder. The simplest method is to observe or monitor, by visual observation through at least one window (22) or physical means, (e.g. the torque required to turn the extruder screw) the amount of polymer chip in the transport screw flights, which may be described as the screw loading or packing, and/or the discharge pressure of molten spinning composition from the extruder, and manually or automatically adjust the flow of polymer chip through the supply hoppers and/or extruder feed hopper. Starved feeding is provided by the feed means providing a flow rate of polymer through the extruder which is less than the rate required to fill all screw flights of the extruder. Preferably, the feed rate has a value ranging from about 25 to about 50 percent of that required to fill all of the transport screw flights.

Preferably, a form of feedback control is used, in which at least one of the parameters including screw loading (23), extruder discharge pressure (26), metering pump outlet pressure (24), metering pump speed (28) and extruder speed (30) (i.e., the rotational speed of the screw) are monitored by appropriate sensors (21), with a signal being generated by the sensors or associated equipment and transmitted to at least one metering controller (32) (which can include, e.g., a microprocessor and appropriate software) which processes these signals and transmits appropriate signals, depending upon what set points or conditions have been imposed by the operator, to a controller (5) acting on at least one of the supply hoppers and extruder feed hoppers to control the rate of flow of polymer chip into the extruder.

Various combinations of suitable sensors and process control equipment can be selected by those skilled in the art to accomplish such control. For example, the extruder discharge pressure can be sensed by a suitable pressure gauge, this pressure being converted to a signal which is transmitted to metering controller (32) for processing, and the resultant processed signal transmitted to at least one flow controller (5) to control the flow of the polymer into the extruder. An example of a typical pressure sensing and control system can be found in U.S. Pat. No. 4,431,598, which is incorporated by reference herein. The speeds of the metering pump and extruder can be monitored by sensors such as tachometers to measure the rotational speed of the pump shaft or extruder screw, or rate of flow indicators to measure the flow rates of polymer feed or molten extrudate, respectively. Any suitable flow indicator can be selected from devices such as are described in Chapter 2 of Badger and Banchero's Introduction to Chemical Engineering (McGraw-Hill, New York). Suitable metering controllers, incorporating relays, analog and/or digital computer components or microprocessors and the like, can be selected to receive at least one signal representing a parameter monitored by such sensors, and to convert the signal to a signal suitable for actuating flow controllers to control the flow rate of polymer feed into the extruder. Appropriate equipment and techniques for automatic control of such processes are described in various standard chemical engineering texts and references, including Perry & Chilton's Chemical Engineers' Handbook, Fifth Edition (McGraw-Hill, 1973), Section 22, which is incorporated herein by reference.

Depending upon the apparatus, materials used and the process being carried out, one or more of these parameters may be critical in observing and correcting developing tendencies for chip crumbling and compaction of the polymer in the screw flights. The essence of the invention is that at least one appropriate parameter is monitored to detect such trends, that a signal is developed and transmitted to an operator or controller communicating with means to control the flow of polymer chip into the extruder, and that such flow is adjusted in a manner responsive to the signals so that the expected problems, i.e. polymer crumbling and compaction in the screw flights, do not develop.

Spinning of the Fibers

As indicated earlier, the above-described organosilicon preceramic polymers are melt spun or extruded as fibers or filaments.

To melt spin, the solid organosilicon polymer and optional additives such as at least one additional thermoplastic polymer, are melted and blended at a temperature and rate sufficient to avoid gelation and foaming. Preferably, substantially immediately thereafter the melted polymer composition is spun or extruded to form fine diameter organosilicon preceramic fiber of improved tensile strength.

Suitable thermoplastic polymers for blending can be selected generally from various types which improve the processability of the organosilicon preceramic fiber, and/or the toughness of the fibers spun therefrom. The polymers blended should be mutually compatible, physically and chemically, and must melt or dissolve in the organosilicon polymer itself.

The organosilicon polymers and additive polymers can be blended in any suitable proportions which produce improved processing and handling characteristics, provided that sufficient preceramic polymer is present in the fibers spun from the blends so that a ceramic fiber having the desired diameter, strength and other characteristics can be produced by pyrolysis. Generally, the blends can contain from about 80 to about 99 weight percent organosilicon polymer, preferably from about 90 to about 95 weight percent.

Prior to spinning, any gel detected in the polymer composition should be removed such as by filtration. In addition, the polymer composition should be essentially free of other contaminants such as small insoluble particulates.

A relatively short residence time of the organosilicon polymer in the melt, thus minimum thermal exposure, is preferable for achieving strong, fine diameter fibers. If an organosilicon polymer composition is brought up to a melt-processable or extrudable temperature and held at such temperature for too long a period of time, gelation will occur, which in turn will lead to the presence of noticeable flaws in the fiber and a concomitant loss of tensile properties. In addition, the melt temperature of the organosilicon polymer composition should be less than that needed to cause foaming of the polymer, which foaming will also lead to the presence of voids or flaws in the fiber. The typical organosilicon polymer is significantly more melt sensitive as compared to other conventional fiber forming polymers, e.g., polyethylene terephthalate.

While allowable total melt residence time may vary from one particular organosilicon polymer to another, in general the total melt residence time should be less than thirty minutes, e.g., about one to twenty minutes, preferably less than about 10 minutes, and most preferably less than five minutes.

The actual melt temperatures may vary, but will generally be above the softening temperature ($T_s$) (or glass transition temperature $T_g$) of the polymer composition, but below that at which foaming, gelation or other degradation occurs within the total melt residence time. Typically, such melt temperature will range from about 30 to 130, preferably from 50 to 100, and most preferably 60° to 80° C. above the $T_s$ of the polymer composition.

As the preceramic fibers are melt spun or extruded, fiber handling is preferably minimized to avoid abrasion of the fibers sufficient to cause fiber breakage during fiber take-up and/or sufficient to induce latent stressing sufficient to cause fiber breakage during subsequent curing and ceramization. Thus, those types of conventional fiber take-up apparatus which induce high levels of stress in fiber are preferably not used. The preceramic fibers as spun are relatively brittle and friable due to their relatively low molecular weight and typically highly branched structure as compared to conventional fiber-forming polymers.

The preceramic fibers as spun may be taken up in any appropriate draw ratio. For example, draw ratios of up to about 1000, preferably from about 50 to about 800, may be used.

Spinning may be conducted at any convenient die pressure in ambient conditions, or, preferably, nitrogen or other inert gas may be used in the spinning chamber, and at atmospheric, subatmospheric, or superatmospheric pressure.

The preceramic fibers of the present invention have typical diameters of from 2 to 100, preferably 2 to 50, and most preferably 2 to 20 μm.

Curing and Ceramization of the Fibers

After spinning, the preceramic fibers are typically cured or cross-linked and thereafter pyrolyzed to ceramic form.

Effective curing conditions are defined as those curing conditions after which the cured fibers become infusible without melting or fusing together, and may be pyrolyzed without melting or fusing together. A variety of curing methods may be used. These include oxidative and hydrolytic cures, reactive cures, thermal cures and radiolytic cures. The presently preferred method of curing is via an oxidative/hydrolytic cure. Typically, this entails heating the fibers in a controlled humidity environment, where humidity can range from about 0 to 100 percent.

Curing may be carried out at temperatures from about 50 to 400° C., preferably 100° C. to 380° C., and most preferably 150° C. to 200° C., the rate of curing increasing with temperature.

Effective pyrolysis conditions are those which render the fibers ceramic. Typically, pyrolysis is conducted in an inert atmosphere of nitrogen, argon, or the like. Pyrolysis temperatures may be from about 600° to 1600°, preferably 850° to 1400°, and most preferably 1100 to 1400° C.

Utility of the Ceramic Fibers

The ceramic fibers produced in accordance with the present invention may be used in high performance composites of any desired shape, e.g., gas turbine engines, and engine components, as is evident to those skilled in the art.

EXAMPLES

The present invention is further illustrated by the following specific examples, wherein all parts and percentages are by weight unless otherwise indicated.

COMPARATIVE RUN A

Melt spinning was done on a spinning apparatus designed to give short melt residence times and minimal fiber handling during the take-up. A charge of organosilicon polymer chip (a methylpolydisilazane in chunks having an average maximum dimension of about ¼"–½") was fed via a conventional gravity fed hopper to an extruder manufactured by Modern Plastic Machinery having a conventional 1 inch diameter screw 24 inches long, having 24 screw flights and a 3:1 compression ratio in the compression section. The transport zone contained 10 flights, the transition zone 7 and the compression zone 7. All flights had a uniform pitch of 1" and a helix angle of 17.66 degrees. The extruder screw was run at a constant speed of about 100 rpm. The feed rate was about 2 lbs/hr, compared to the maximum extruder feed rate of about 6 lbs/hr. Internal pressures were kept as low as possible by using a low feed rate, generally about 50 to 100 psi, and less than 100 psi at the extruder discharge, usually the maximum pressure point. The polymer chip was heated and melted in a portion of the compression zone, thereafter entering a nozzle and a constant speed metering pump. This configuration gives a constant rate of melting and, consequently, of extrusion or spinning while holding most of the polymer charge below its melt temperature. The molten polymer blend is then forced through a series of filters (−80/+120 mesh shattered metal type). Upon exiting the filter pack, the molten polymer blend passes directly through a 20 hole spinneret (0.2 mm diameter×0.267 mm long hole). The temperatures at various points in the extruder were as follows:

| | |
|---|---|
| Entry (feed zone) - | 100° C. |
| Center (transition zone) - | 130° C. |
| Front (end of compression zone) - | 140° C. |
| Metering Pump - | 145° C. |
| Upper Block (just below metering pump) - | 140° C. |
| Lower Block (just above spinneret) - | 140° C. |
| Filter Pack (between lower block and spinneret) - | 145° C. |

The polymer melt leaves the spinneret at a linear velocity of about 5 meters per minutes (mpm), and is then taken up on a bobbin at linear velocities up to 300 mpm. In the approximately 1.25 meter distance between the spinneret and the bobbin, the filament experiences a draw ratio as high as 200, and filaments as small as eight microns are produced, with 15 micron spun fiber diameter being more typical. The fiber is wound on the bobbin without traversing and effort is made to avoid subjecting the fiber to abrasion-inducing handling. The fiber on the bobbin is then normally stored in a nitrogen-filled dry box held at a dew point of −40° C. or lower, prior to subsequent curing and pyrolysis.

Although the threadline spun well at first, the trial was aborted after 30 minutes due to feeding problems which ultimately prevented the polymer from exiting the spinneret. With the extruder screw driven to rotate at constant speed, the flow of polymer from the spinneret slows, internal pressure increases, as reflected by a signal from a pressure gauge indicating increased loading of the screw, and the torque required to turn the screw increases. As the polymer compacts and cross-links in the screw, the polymer flow would cease and the extruder controls would turn off the motor due to excessive torque requirements.

EXAMPLE I

Melt spinning is done on the same spinning apparatus as in Comparative Run A, except, using a conventional extruder as described for Comparative Run A, the gravity feed hopper is removed, exposing the feed zone and the first two transport screw flights. A slanted chute adjustable to a slope exceeding the angle of repose of the feed polymer particles is installed for the introduction of feed polymer. The methylpolydisilazane chip of Comparative Run A is ground to a small relatively uniform particle size (i.e., 80 percent of the particles having a maximum dimension of 0.03 inch) such as is produced by a drip feeder. The ground polymer particles are manually fed into the feed zone, using the feed chute, at a rate of approximately 1 lb/hr.

The polymer is melt spun, using the temperature profile described in Comparative Run A. By monitoring the emergence of the spun fiber from the spinneret, and the extruder discharge pressure, which generates a signal in a pressure gauge representing the loading on the screw, the ground polymer can be manually fed into the extruder at a rate sufficient to maintain steady spinning of a substantially uniform fiber, but low enough to avoid pressure fluctuation or buildup in the extruder. Problems in feeding the polymer or its flow through the extruder are thus expected to be avoided. The desired results are generally expected to be achieved by feeding polymer at a rate which keeps the two visible transport screw flights about half full. By manually feeding the extruder via a gravity chute to provide starved feeding, the polymer feed through the extruder and spinning process are improved, and problems arising from excessive gravitational overpressure in the feed system are expected to be eliminated.

EXAMPLE II

Melt spinning of Comparative Run A was repeated using similar extruder apparatus with an air cooled aluminum-sleeved barrel, except in place of the gravity-fed hopper, a K-Tron drip feeder was used to provide "starved feeding" at a rate of about 1 lb/hr. The drip feeder ground the polymer chip to finely-divided, substantially powder-free particles of substantially uniform size (80 percent of the particles had a maximum dimension of approximately 0.030 inch). A 20 hole spinneret having a hole diameter of 0.075 mm was used.

Temperatures at various points in the extruder were as follows:

| | |
|---|---|
| Entry (feed zone) - | 107° C. |
| Center (transition zone) - | 140° C. |
| Front (end of compression zone) - | 150° C. |
| Metering Pump - | 160° C. |
| Upper Block (just below metering pump) - | 153° C. |
| Lower Block (just above spinneret) - | 150° C. |
| Filter Pack (between lower block and spinneret) - | 155° C. |

The extruder temperatures in the entry and transition zones and the end of the compression zone were monitored, as well as the polymer temperature just above the filter pack and the takeup speed. The polymer melt pressure at the extruder outlet (just above the metering pump) was visually monitored and the feed rate of the drip feeder manually adjusted to maintain the pressure at $100 \pm 20$ psi. Maximum pressure at the extruder outlet was approximately 120 psi.

Spinning with this system was very stable, running for 1 hour at a relatively low takeup speed of 18.3 mpm and using traverse winding on the bobbin. The use of the drip feeder to provide starved feeding alleviates the feeding problems encountered with conventional gravity feed systems.

Although the invention has been described with preferred embodiments, it is to be understood that variations and modifications can be employed without departing from the gist of the invention.

What is claimed is:

1. A process for producing preceramic fibers from an organosilicon preceramic polymer by melt spinning a polymer spinning composition comprising said organosilicon preceramic polymer in a spinning apparatus comprising an extruder feed means and a screw-type extruder having transport and compression screw flights discharging into a nozzle means, said organosilicon preceramic polymer having a molecular weight ($M_n$) of from about 500 to 20,000 and said polymer spinning composition being loaded at a feed rate to said extruder from said feed means in the form of friable particles, said process comprising the steps of:
   (a) monitoring at least one parameter representative of the loading of said screw-type extruder screw withy the polymer spinning composition,
   (b) generating a signal representative of said loading of said screw-type extruder, and
   (c) in response to said signal, adjusting the feed rate of said polymer spinning composition to said extruder through said feed means to provide a flow rate of said polymer spinning composition within said extruder which is less than the flow rate required to fill all screw flights of said extruder at a given extruder screw speed, thereby providing starved feeding to said extruder.

2. A process in accordance with claim 1, wherein said at least one parameter is at least the amount of polymer spinning composition in the transport screw of lights of said extruder, the discharge pressure of said polymer spinning composition from said extruder, or the speed of the extruder crew.

3. A process in accordance with claim 1, wherein said polymer spinning composition is independently metered to said feed means at a feed rate after observation of at least one of the amount of said spinning composition in said transport screw flights or the discharge pressure of said spinning composition from said extruder.

4. A process in accordance with claim 1, wherein the polymer spinning composition is discharged from said nozzle means into a metering pump means and said at least one parameter is at least the oulet pressure or pumping speed of said metering pump means.

5. A process in accordance with claim 4, wherein said polymer spinning composition is fed at a feed rate to said extruder feed means through external metering response to a signal based upon measured values of at least one of the speed of the extruder screw or the pumping speed of said metering pump means.

6. A process in accordance with claim 1, wherein said speed rate has a value ranging from about 25 to about 50 percent of that required to fill all said transport screw flights.

7. A process in accordance with claim 1, wherein the flow of polymer spinning composition through said spinning apparatus is at least partially carried out under an inert atmosphere.

8. A process in accordance with claim 1, wherein said polymer spinning composition is provided to said extruder feed means as polymer chips of substantially uniform size and substantially free of fines.

9. A process in accordance with claim 1, p1 wherein said polymer spinning composition is processed in said extruder feed means to finely-divided, substantially powder-free particles of substantially uniform size.

10. A process in accordance with claim 1, wherein said organosilicon preceramic polymer is selected from the group consisting of polysilanes, polycarbosilanes, polysilylazanes and polysilazanes.

11. A process in accordance with claim 1, wherein said polymer spinning composition consists essentially of said organosilicon preceramic polymer.

12. A process in accordance with claim 1, wherein said polymer spinning composition oomprises at least one synthetic fiber-forming polymer in addition to said organosilicon preceraic polymer.

13. A process for producing preceramic fibers from an organosilicon preceramic polymer which process comprises melt spinning a spinning composition comprising said organosilicon preceramic polymer in a spinning a apparatus comprising an extruder feed means, a screw-type extruder having screw flights and a metering pump means, said organosilicon preceramic polymer having a molecular weight ($M_n$) of from about 500 to 20,000 and said spinning composition being provided to said extruder from said feed means in the form of friable particles, wherein said feed means are externally metered to provide a feed rate of said spinning composition which is substantially less than that required to fill all the screw flights of said screw-type extruder.

14. A process in accordance with claim 13, wherein said feed means is cooled to a temperature less than the glass transition temperature of said organosilicon polymer.

15. A process in accordance with claim 13, wherein said spinning apparatus comprises an extrusion nozzle and die and a threadline enclosure, each of which are heated to a temperature above the glass transition temperature of said organosilicon polymer through which said polymer spinning composition is extruded 16. A process for producing, preceramic fibers from an organosilicon preceramic polymer by melt spinning polymer spinning composition comprising said organosilicon preceramic polymer in a spinning apparatus comprising an extruder feed means including a feed hopper having means for controlling the level of polymer spinning composition introuced thereto, a screw-type extruder having transport and compression screw flights discharging into nozzle means, and a metering pump means downstream of said nozzle means, said organosilicon preceramic polymer having a molecular weight ($M_n$) of from about 500 to 20,000 and said polymer spinning composition being loaded to said extruder from said feed copper in the form of friable particles, said process comprising the steps of:
  (a) controlling the level of said polymer spinning composition particles in said feed hopper to minimize gravitation overpressure,
  (b) monitoring at least one parameter representative of the loading of said extruder screw with the polymer spinning composition said at least one parameter is at least the speed of said extrudor screw or the pumping speed of said metering pump means,
  (c) generating a signal representative of said loading of said extruder screw, and
  (d) in response to said signal, adjusting the feed rate of said polymer spinning composition to said extruder through said feed means to provide a feed rate of said polymer spinning composition which is substantially less than that required to fill all screw flights of said extruder at a given extruder screw speed, thereby providing starved feeding to said extruder.

17. A process for producing preceramic fibers from an orgnosilicon preceramic polymer by melt spinning a polymer spinning composition comprising said organosilicon preceramic polymer in a spinning apparatus comprising an exturder feed means including a drip feeder, a screw-type extruder having transport and compression screw flights discharging into a nozzle means, and metering pump means downstream of said nozzle means, said organosilicon preceramic polymer having a molecular weight ($M_n$) of from about 500 to 20,000 and said polymer spinning composition being loaded to said extruder from said drip feeder in the form of friable particles, said process comprising the steps of:
  (a) monitoring at least one parameter representative of the loading of said extruder screw with the polymer spinning composition, said at least one parameter is at least the speed of said extruder the pumping speed of said metering means,
  (b) generating a signal representative of said loading of said extruder screw, and
  (c) in response to said signal, adjusting the feed rate of said polymer spinning composition to said extruder through said feed means to provide a feed rate which is substantially less than that required to fill the transport screw flights of said extruder and thereby starve feeding said extruder, such that said polymer spinning composition is not subjected to gravitational overpressure and pulverization, and compaction and cross-linking of said polymer in the extruder are substantially avoided.

18. A process for producing ceramic fibers from an organosilicon preceramic polymer by melt spinning a polymer spinning composition comprising said organosilicon preceramic polymer in a spinning spparatus comprising an extruder feed means and a screw-type extruder having transport and compression screw flight discharging into a nozzle means, said organosilicon preceramic polymer having a molecular weight ($M_n$) of from about 500 to 20,000 and said polymer spinning composition being loaded at a feed rate to said extruder from said feed means in the form of friable particles, said process comprising the steps of:
  (a) monitoring at least one parameter representative of the loading of said screw-type extruder with the polymer spinning composition,
  (b) generating a signal representative of said loading of said screw-type extruder, and
  (c) in response to said signal, adjusting the feed rate of said polyer spinning composition to said extruder through said feed means to provide a flow rate of said polymer spinning composition within said extruder which is less than the flow rate required to fill all screw flights of said extruder at a given extruder screw speed, thereby providing starved feeding to said extruder;
  curing the spun fibers at a temperature effective to render them infusible without melting or fusing together, and thereafter pyrolyzing the cured fibers at a temperature effective to produce ceramic fibers.

19. A process for producing ceramic fibers from an organosilicon preceramic polymer by melt spinning a polymer spinning composition comprising said organosilicon preceramic polymer in a spinning apparatus comprising an extruder feed means including a feed hopper having means for controlling the level of polymer spinning composition entroduced thereto, a screw-type extruder having transport and compression screw flights discharging into a nozzle means, and a metering pump means downstream of said nozzle means, said organosilicon precermic polymer having a molecular weight (Mn) of from about 500 to 20,000 and said polymer spinning composition being loaded to said extruder from said feed hopper in the form of friable particles, said process comprising the steps of:
  (a) controlling the level of said polymer spinning composition particles in said feed hopper to minimize gravitation overpressure,
  (b) monitoring at least one parameter representative of the loading of said extruder screw with the polymer spinning composition, said at least one parameter is at least the speed of said extruder screw or the pumping speed of said metering pump means,
  (c) generating a signal representative of said loading of said extruder screw, and
  (d) in response to said signal, adjusting the feed rate of said polymer spinning composition to said extruder through said feed means to provide a feed rate of said polymer spinning composition which is substantially less than that required to fill all screw flights of said extruder at given extruder screw speed, thereby providing starved feeding to said extruder;
  curing the spun fibers at a temperature effective to render them infusible without melting or fusing together, and thereafter pyrolyzing the cured fibers at a temperature effective to produce ceramic fibers.

* * * * *